(12) United States Patent
Lasagni

(10) Patent No.: US 10,661,662 B2
(45) Date of Patent: May 26, 2020

(54) BATTERY CHARGER FOR ELECTRIC VEHICLES

(71) Applicant: Meta System S.p.A., Reggio Emilia (IT)

(72) Inventor: Cesare Lasagni, Reggio Emilia (IT)

(73) Assignee: Meta System S.p.A., Reggio Emilia (IT)

( * ) Notice: Subject to any disclaimer, the term of this patent is extended or adjusted under 35 U.S.C. 154(b) by 47 days.

(21) Appl. No.: 14/909,146

(22) PCT Filed: Jul. 30, 2014

(86) PCT No.: PCT/IB2014/063549
§ 371 (c)(1),
(2) Date: Feb. 1, 2016

(87) PCT Pub. No.: WO2015/015437
PCT Pub. Date: Feb. 5, 2015

(65) Prior Publication Data
US 2016/0167536 A1    Jun. 16, 2016

(30) Foreign Application Priority Data

Aug. 1, 2013 (IT) .............................. MO2013A0224

(51) Int. Cl.
*H02J 7/00* (2006.01)
*B60L 11/18* (2006.01)
(Continued)

(52) U.S. Cl.
CPC ............. *B60L 11/1838* (2013.01); *B60L 3/00* (2013.01); *B60L 3/0092* (2013.01); *B60L 3/04* (2013.01);
(Continued)

(58) Field of Classification Search
CPC .. B60L 11/1838; B60L 11/1816; B60L 53/14; B60L 53/60; H02J 7/0029
USPC ............................................. 320/109
See application file for complete search history.

(56) References Cited

U.S. PATENT DOCUMENTS 5,669,470 A * 9/1997 Ross ................. B60L 5/005
191/10
7,135,836 B2 * 11/2006 Kutkut ................ H02J 7/022
320/116
(Continued)

FOREIGN PATENT DOCUMENTS

| EP | 2613422 | 7/2013 |
| WO | WO 2015/015437 | 2/2015 |

OTHER PUBLICATIONS

International Search Report and the Written Opinion dated Oct. 16, 2014 From the International Searching Authority Re. Application No. PCT/IB2014/063549 and Its Translation Into English.

*Primary Examiner* — Drew A Dunn
*Assistant Examiner* — Tessema Kebede

(57) ABSTRACT

The battery charger (1) for electric vehicles comprises a container (2), a first power unit (3) housed inside said container (2), connectable at input to an external power supply line (L) and connectable at output to a battery (B) of an electric vehicle (V), and an electronic control unit (4) housed inside the container (2) and operatively connected to the first power unit (3), and a second power unit (6) housed inside the container (2), operatively connected to the electronic control unit (4), connectable at input to at least an external power supply line (L) and connectable at output to the battery (B) of the electric vehicle (V).

5 Claims, 1 Drawing Sheet

(51) Int. Cl.
*H02J 7/02* (2016.01)
*B60L 3/00* (2019.01)
*B60L 3/04* (2006.01)
*B60L 53/60* (2019.01)
*B60L 53/14* (2019.01)

(52) U.S. Cl.
CPC ............... *B60L 53/14* (2019.02); *B60L 53/60* (2019.02); *H02J 7/022* (2013.01); *H02J 7/0027* (2013.01); *H02J 7/0029* (2013.01); *Y02T 10/7005* (2013.01); *Y02T 10/7055* (2013.01); *Y02T 10/7072* (2013.01); *Y02T 90/14* (2013.01)

(56) References Cited

U.S. PATENT DOCUMENTS

| | | | | |
|---|---|---|---|---|
| 8,463,472 B2 * | 6/2013 | Watanabe | .............. | G07C 5/085 320/109 |
| 8,890,474 B2 * | 11/2014 | Kim | ........................ | B60L 3/003 180/65.1 |
| 8,994,338 B2 * | 3/2015 | Khan | ................... | B60L 11/1816 307/10.1 |
| 2004/0130292 A1 * | 7/2004 | Buchanan | ............ | H01M 10/441 320/116 |
| 2004/0189251 A1 * | 9/2004 | Kutkut | ..................... | H02J 7/022 320/128 |
| 2009/0127933 A1 * | 5/2009 | Simonazzi | ............... | H02J 9/062 307/66 |
| 2011/0304298 A1 * | 12/2011 | Gow | ..................... | H02J 7/0052 320/107 |
| 2012/0181983 A1 | 7/2012 | Khan et al. | | |
| 2013/0113290 A1 * | 5/2013 | Sato | ....................... | B60L 3/0046 307/80 |
| 2014/0062396 A1 * | 3/2014 | Reddy | ................... | H01M 10/44 320/109 |
| 2014/0265600 A1 * | 9/2014 | Tsukamoto | ................ | H02J 1/00 307/77 |
| 2015/0069963 A1 * | 3/2015 | Ichikawa | ................... | B60L 1/02 320/108 |

\* cited by examiner

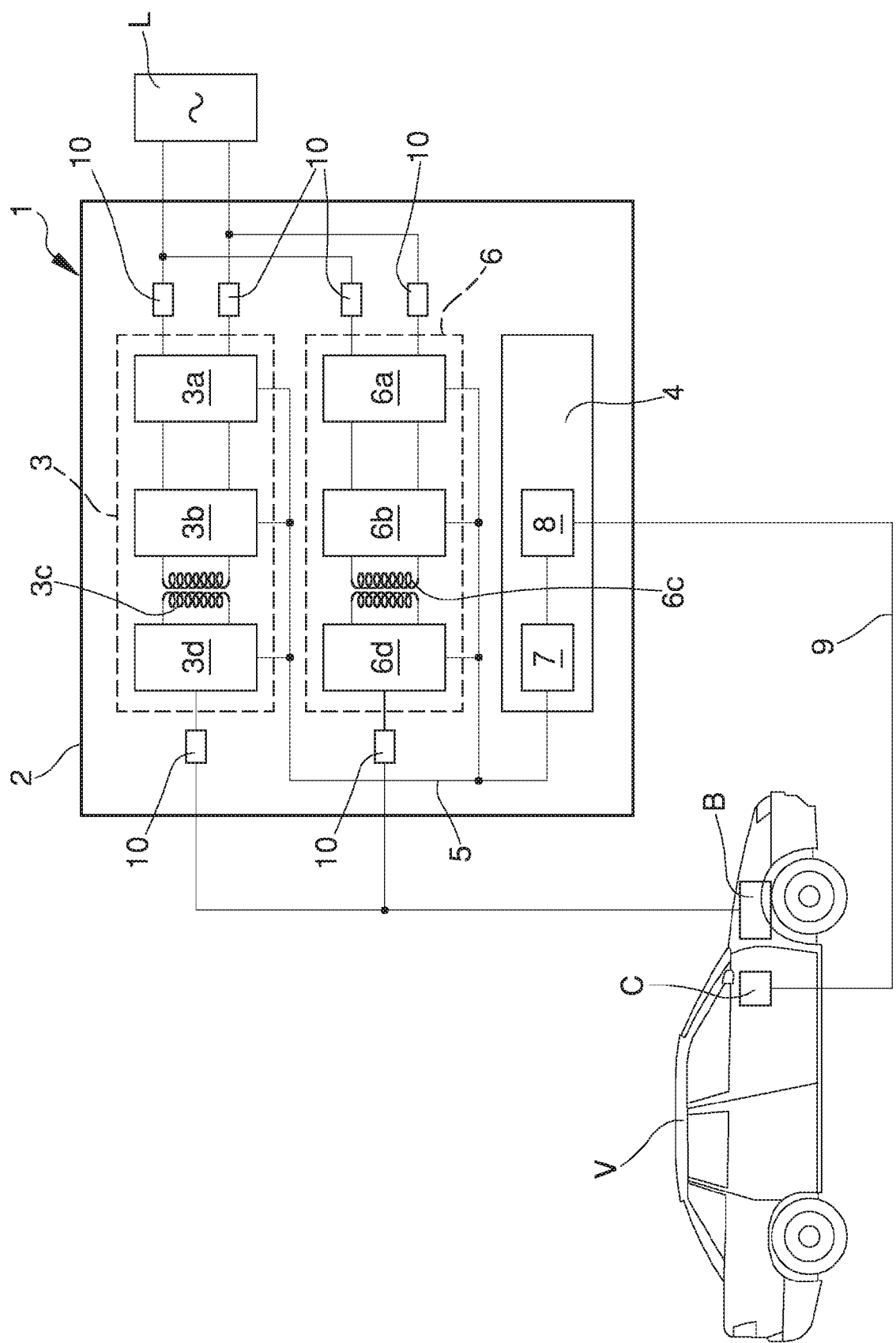

BATTERY CHARGER FOR ELECTRIC VEHICLES

RELATED APPLICATIONS

This application is a National Phase of PCT Patent Application No. PCT/IB2014/063549 having International filing date of Jul. 30, 2014, which claims the benefit of priority of Italian Patent Application No. MO2013A000224 filed on Aug. 1, 2013. The contents of the above applications are all incorporated by reference as if fully set forth herein in their entirety.

FIELD AND BACKGROUND OF THE INVENTION

The present invention relates to a battery charger for electric vehicles.

The use is known of battery chargers for electric vehicles, i.e., appliances that can be connected to the conventional power supply line and to the battery of an electric vehicle, to recharge the battery itself.

In particular, such battery chargers are able to convert an alternating voltage at input, supplied by the conventional power supply line, into a direct current at output.

More specifically, common battery chargers comprise a power unit able to supply the output voltage towards the battery, controlled by a respective electronic control unit.

In particular, the electronic control unit can be connected to the station of the vehicle by means of the conventional CAN (Controller Area Network) bus and generally comprises an interface of communication with the station itself able to receive predefined control signals.

The electronic control unit also comprises an internal control device, of the type e.g. of a DSP (Digital Signal Processor), able to interpret and convert the control signals coming from the vehicle station into control signals of the power unit.

In particular, the control device can simply command the switching on and off of the power unit, can regulate the power supplied by it or can perform test operations on the power unit itself.

As is known, the maximum output power of a battery charger is restricted by the maximum input current coming from the power supply line (generally not above 16 A).

Consequently, battery chargers of the conventional type are able to supply a maximum power between 3000 W and 3500 W, something that generally requires long battery recharge times of the electric vehicle.

To overcome this drawback, the simultaneous use is known of two battery chargers in parallel, supplied by the same phase or different phases of the power supply line. Alternatively, the use is known of a single battery charger having a power unit able to supply a greater power.

Nevertheless, such solutions are not without drawbacks either.

In particular, the use of two battery chargers in parallel necessarily involves a considerably high cost.

It is in fact known that in particular the power unit of a battery charger can be subject to failures and that, in this case, the entire damaged battery charger has to be replaced.

In particular, in the case of the use of a single battery charger with a power unit able to supply a greater output power, this would mean the impossibility of charging the vehicle until the battery charger itself had been replaced.

Furthermore, the use of two battery chargers in parallel means considerable overall dimensions.

SUMMARY OF THE INVENTION

The main aim of the present invention is to provide a battery charger for electric vehicles able to supply a greater power than battery chargers of conventional type, while at the same time ensuring low costs and reduced overall dimensions.

Another object of the present invention is to provide a battery charger for electric vehicles which permits greater efficiency than the use of two battery chargers in parallel.

Another object of the present invention is to provide a battery charger for vehicles that allows to overcome the mentioned drawbacks of the prior art in the ambit of a simple, rational, easy and effective to use as well as low cost solution.

The above mentioned objects are achieved by the present battery charger for electric vehicles according to claim 1.

BRIEF DESCRIPTION OF THE SEVERAL VIEWS OF THE DRAWINGS

Other characteristics and advantages of the present invention will become better apparent from the description of a preferred, but not exclusive, embodiment of a battery charger for electric vehicles, illustrated by way of an indicative, but not limitative, example in the joined table of drawings, in which the FIG. 1 is a functional diagram of the battery charger according to the invention.

DESCRIPTION OF SPECIFIC EMBODIMENTS OF THE INVENTION

With particular reference to these FIGURES, globally indicated with reference number 1 is a battery charger which can be used for charging batteries of electric vehicles.

The battery charger 1 comprises an external container 2 of reduced dimensions, able to house all the electronics.

In particular, the battery charger 1 comprises a first power unit 3 housed inside the container 2.

The first power unit 3 can be connected at input to an external power supply line L and can be connected at output to at least a battery B of an electric vehicle V.

For example, the first power unit 3 can comprise a first conversion unit 3a able to convert the alternating current from the supply line L into direct current, a second conversion unit 3b able to convert direct current into alternating current, a transformer 3c and a third conversion unit 3d able to convert alternating current into direct current, connected to the battery B of the vehicle V.

The battery charger 1 also comprises an electronic control unit 4 housed inside the container 2 and operatively connected to the first power unit 3, e.g., by means of a specific bus 5, for piloting the first power unit itself.

Advantageously, the battery charger 1 comprises a second power unit 6 housed inside the container 2.

In particular, the second power unit 6 is operatively connected to the electronic control unit 4, is connectable at input to the external power supply line L and is connectable at output to the battery B of the electric vehicle V.

The second power unit 6 can e.g. comprise a first conversion unit 6a able to convert the alternating current from the supply line L into direct current, a second conversion unit 6b able to convert direct current into alternating current, a transformer 6c and a third conversion unit 6d able to convert alternating current into direct current, connected to the battery B of the vehicle V.

The electronic control unit 4 comprises piloting means 7 able to pilot both the first power unit 3 and the second power unit 6.

The electronic control unit 4 can comprise a communication interface 8 able to communicate with the station C of the vehicle V, e.g., through the conventional CAN (Controller Area Network) bus, indicated in the illustration by the reference number 9.

The piloting means 7 can comprise an internal control device, of the type e.g. of a DSP (Digital Signal Processor), able to interpret and convert the control signals from the station C of the vehicle V into control signals of the first and second power units 3 and 6.

Piloting means 7 e.g. can simply command the switching on and off of one or both the power units 3 and 6, can regulate the power supplied by them or can perform test operations on the power units themselves.

Advantageously, the use of two distinct power units 3 and 6, together with the use of a single electronic control unit 4, permits supplying a greater power compared to battery chargers of conventional type, at the same time ensuring low costs and reduced overall dimensions.

Furthermore, compared to the use of a single battery charger with greater power, the battery charger according to the invention also permits charging the battery of a vehicle in case of a failure affecting one of the two power units.

Preferably, the total power at output from the first power unit 3 and from the second power unit 6 is between 6000 W and 7000 W.

Usefully, the battery charger 1 comprises electric cut-out means 10 operatively placed between the electronic control unit 4 and the first and second power units 3 and 6.

In particular, the electric cut-out means 10 are able to cut out the power connection between the electronic control unit 4 and the first power unit 3 or the second power unit 6 in case of a failure affecting the latter.

Preferably, the electric cut-out means 10 comprise fuses or, in any case, suitable electric components able to support energy backflow.

In particular, the electric cut-out means 10 are placed between the first and the second power units 3 and 6 and the power supply line L.

Furthermore, the electric cut-out means 10 are placed between the first and the second power units 3 and 6 and the battery B of the vehicle V.

Such fuses or electrical components 10 are able to protect the electronic control unit 4 in case of over-currents coming from the first power unit 3 or from the second power unit 6.

It has in fact been ascertained how the described invention achieves the proposed objects.

In particular, the fact is underlined that the battery charger according to the invention is able to supply a greater power than that of conventional type battery chargers and at the same time ensures low costs and reduced dimensions.

Furthermore, with respect to the use of a single battery charger with greater power, the battery charger according to the invention also permits charging the battery of a vehicle in case of a failure affecting one of the two power units.

What is claimed is:

1. Battery charger (1) for electric vehicles, comprising:
   a container (2);
   at least a first power unit (3), connectable at input to at least an external power supply line (L) and connectable at output to at least a battery (B) of an electric vehicle (V), the first power unit (3) comprising:
   a first conversion unit (3a) able to convert alternating current from the supply line (L) into direct current;
   a second conversion unit (3b) able to convert direct current into alternating current;
   a transformer (3c); and
   a third conversion unit (3d) able to convert alternating current into direct current, and connected to the battery (B);
   at least a single electronic control unit (4) housed inside said container (2) and operatively connected to said first power unit (3);
   at least a second power unit (6) housed inside said container (2), operatively connected to said electronic control unit (4), connectable at input to at least an external power supply line (L) and connectable at output to said at least a battery (B) of the electric vehicle (V), the second power unit (6) comprising:
   a first conversion unit (6a) able to convert alternating current from the supply line (L) into direct current;
   a second conversion unit (6b) able to convert direct current into alternating current;
   a transformer (6c); and
   a third conversion unit (6d) able to convert alternating current into direct current, and connected to the battery (B);
   at least a communication interface (8) connectable to a station (C) installed in said vehicle (V) and configured to communicate with said station (C); and
   a piloting means (7) of said first power unit (3) and of said second power unit (6), said piloting means interprets and converts control signals received from said station, through said communication interface, to control signals provided to said first power unit and to said second power unit;
   electric cut-out means (10) operatively placed between said battery (B) and the third conversion unit (3d) of the first power unit (3), between said battery (B) and the third conversion unit (6d) of the second power unit (6), between said power supply line (L) and the first conversion unit (3a) of the first power unit (3), and between the power supply line (L) and the first conversion unit (6a) of the second power unit (6),
   wherein, in case of failure of the first power unit (3) or the second power unit (6), said electric cut-out means (10) are configured to cut out the electric connection between the failed first power unit (3) or second power unit (6) and said power supply line (L) and said battery (B), while permitting regular functioning of the other of the first power unit (3) or second power unit (6);
   wherein the single electronic control unit (4) is operatively connected to said first power unit (3) and to said second power unit (6);
   wherein said first power unit (3), said second power unit (6) and said electronic control unit (4) are housed inside an external container (2).

2. Battery charger (1) according to claim 1, wherein the total power at output from said first power unit (3) and said second power unit (6) is between 6000 W and 7000 W.

3. Battery charger (1) according to claim 1, wherein said electric cut-out means (10) comprise at least an electric component able to support energy backflow from said power supply line (L) and/or from said battery (B).

4. Battery charger (1) according to claim 1, wherein said electric cut-out means (10) comprises at least a fuse.

5. Battery charger according to claim 1, wherein said piloting means regulates a power supplied by said first and said second power units, and performs testing of said first and said second power units.

\* \* \* \* \*